(12) United States Patent
Yoshitani

(10) Patent No.: US 7,746,995 B2
(45) Date of Patent: Jun. 29, 2010

(54) TELEPHONE CONTROL SYSTEM

(75) Inventor: Norifumi Yoshitani, Nabari (JP)

(73) Assignee: Sharp Kabushiki Kaisha, Osaka (JP)

( * ) Notice: Subject to any disclaimer, the term of this patent is extended or adjusted under 35 U.S.C. 154(b) by 1848 days.

(21) Appl. No.: 10/649,955

(22) Filed: Aug. 28, 2003

(65) Prior Publication Data

US 2004/0052348 A1   Mar. 18, 2004

(30) Foreign Application Priority Data

Aug. 30, 2002   (JP)   ............................ P2002-255791

(51) Int. Cl.
*H04M 3/42* (2006.01)
*H04M 1/00* (2006.01)
*H04M 9/00* (2006.01)

(52) U.S. Cl. .................. 379/207.02; 379/156; 379/171

(58) Field of Classification Search ............ 379/207.02, 379/171, 207.1, 156, 164
See application file for complete search history.

(56) References Cited

U.S. PATENT DOCUMENTS 5,602,910 A * 2/1997 Tsutsui et al. .......... 379/212.01
5,841,851 A * 11/1998 Recht et al. .................. 379/156
6,625,474 B1 * 9/2003 Bussan et al. ............... 455/563

FOREIGN PATENT DOCUMENTS

| JP | 4-172743 | 6/1992 |
| JP | 5-344054 | 12/1993 |
| JP | 2001-292463 | 10/2001 |

* cited by examiner

Primary Examiner—William J Deane
(74) Attorney, Agent, or Firm—Nixon & Vanderhye, PC

(57) ABSTRACT

An example master telephone set constituting a telephone control system includes a status setting unit, a status discrimination unit, an incoming-call detection unit, a notification unit, and a master-set control unit for controlling the operations of the respective units. When, in a state in which the incoming-call detection unit has detected a new incoming call signal from any other line, the status discrimination unit discriminates that one line is in a call holding status, the master-set control unit controls the notification unit so that the pertinent incoming call is notified by, at least, tone information. On the other hand, when the status discrimination unit discriminates, in the same state, that one line is in an on-call status, the master-set control unit controls the notification unit so that the pertinent incoming call is notified by, at least, visible information.

16 Claims, 9 Drawing Sheets

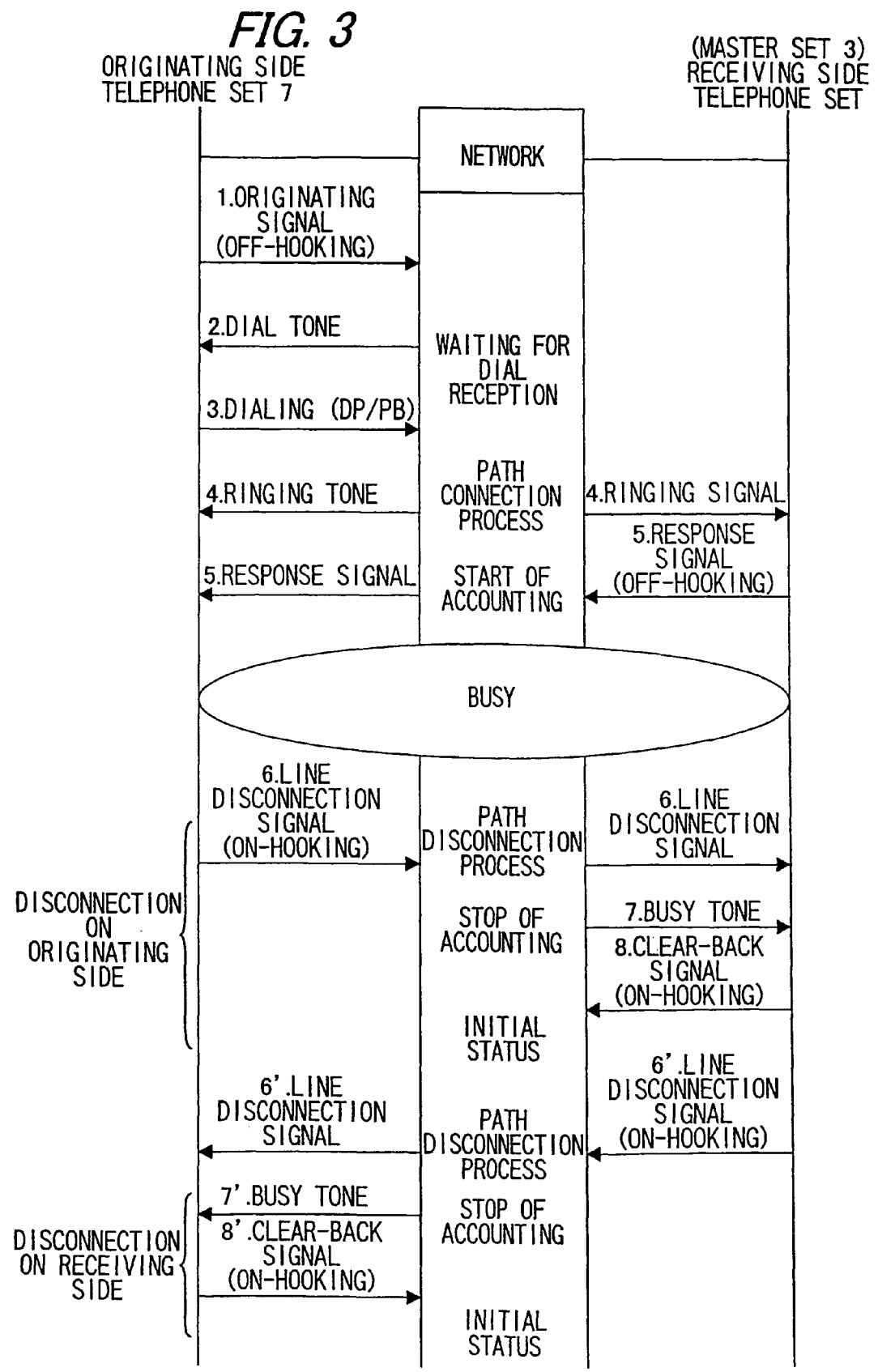

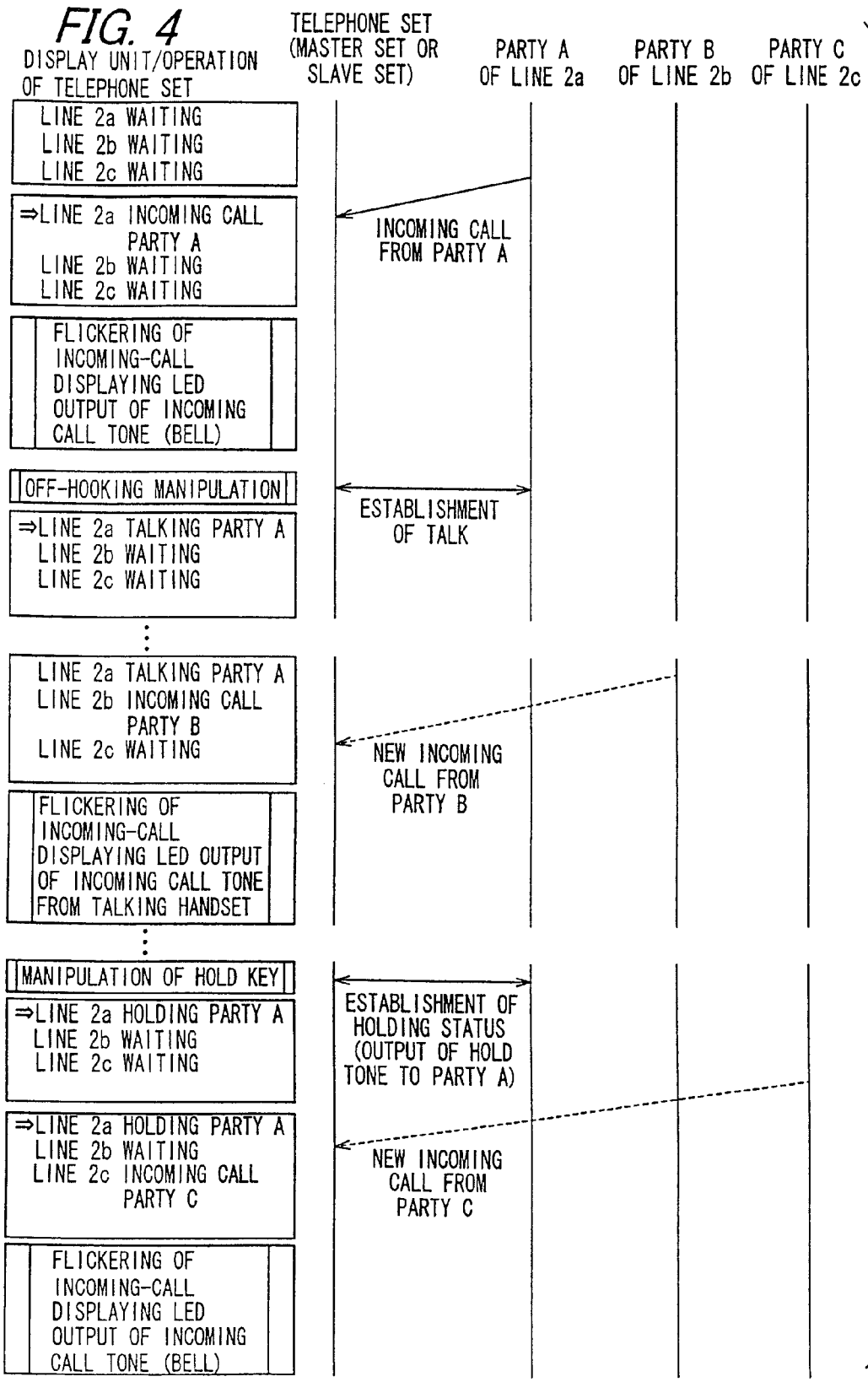

FIG. 5

| STATUS OF TELEPHONE SET | INPUTTED SIGNAL (MANIPULATION OF TELEPHONE SET) | OPERATION OF TELEPHONE SET |
|---|---|---|
| ON HOOK (WAITING) STATUS (STATUS WHERE NO CALL HAS BEEN RECEIVED YET) | PAGE KEY SIGNAL | OUTPUT OF RINGING TONE (BELL) |
| | INCOMING CALL SIGNAL | DISPLAYS OF INCOMING CALL (SCREEN, LED), OUTPUT OF INCOMING CALL TONE (BELL) |
| ON CALL (TALKING) STATUS | PAGE KEY SIGNAL | TEMPORARY HOLDING OF TALK, OUTPUT OF RINGING TONE (BELL) |
| | NEW INCOMING-CALL SIGNAL | DISPLAYS OF INCOMING CALL (SCREEN, LED), OUTPUT OF INCOMING CALL TONE (FROM HANDSET) |
| CALL HOLDING (TALK HOLDING) STATUS | PAGE KEY SIGNAL | OUTPUT OF RINGING TONE (BELL) |
| | NEW INCOMING-CALL SIGNAL | DISPLAYS OF NEW INCOMING CALL (SCREEN, LED), OUTPUT OF INCOMING CALL TONE (BELL) |

FIG. 6

| STATE OF TELEPHONE SET | INPUTTED SIGNAL (MANIPULATION OF TELEPHONE SET) | OPERATION OF TELEPHONE SET |
|---|---|---|
| RINGING-TONE OUTPUT STATE IN ON HOOK (WAITING) STATUS | PAGE-RELEASE KEY SIGNAL | STOP OF RINGING TONE (BELL), RE-WAITING STATUS |
| | NEW INCOMING-CALL SIGNAL | STOP OF RINGING TONE (BELL), DISPLAYS OF INCOMING CALL (SCREEN, LED), OUTPUT OF INCOMING CALL TONE (BELL), RE-WAITING STATUS |
| RINGING-TONE OUTPUT STATE IN TEMPORARY CALL HOLDING (TALK HOLDING) STATUS | PAGE-RELEASE KEY SIGNAL | STOP OF RINGING TONE (BELL), RE-TALKING STATUS |
| | NEW INCOMING-CALL SIGNAL | STOP OF RINGING TONE (BELL), DISPLAYS OF INCOMING CALL (SCREEN, LED), OUTPUT OF INCOMING CALL TONE (FROM HANDSET), RE-TALKING STATUS |
| RINGING-TONE OUTPUT STATE IN CALL HOLDING (TALK HOLDING) STATUS | PAGE-RELEASE KEY SIGNAL | STOP OF RINGING TONE (BELL), RE-TALK-HOLDING STATUS |
| | NEW INCOMING-CALL SIGNAL | STOP OF RINGING TONE (BELL), DISPLAYS OF INCOMING CALL (SCREEN, LED), OUTPUT OF INCOMING CALL TONE (BELL), RE-TALK-HOLDING STATUS |

TELEPHONE CONTROL SYSTEM

BACKGROUND OF THE INVENTION

1. Field of the Invention

The present invention relates to a telephone control system.

2. Description of the Related Art

At the present time at which information communication networks have progressed, people communicate with one another more often by telephone conversation than by correspondence. Accordingly, a situation frequently arises where an incoming call is received on a busy line connected to a telephone set. In that case, a busy signal is issued to the telephone receiver of a user who called the busy line, so that ordinarily the user calls back after a certain time period. An interrupt connection service has been devised as one technique for eliminating such an inconvenience. Regarding the actual operation of the interrupt connection service, however, several problems are involved.

By way of example, when a busy telephone line receives an incoming call from a calling party, the interrupt connection service sends an incoming call tone to the busy telephone line, thereby to notify the occurrence of the interrupt incoming call to the user of the service. However, when the interrupt connection service is employed in a single line, there is the problem that the user must disconnect the busy line once and thereafter call the opposite party having made the interrupt connection.

A technique for addressing this problem is disclosed in, for example, Japanese Unexamined Patent Publication JP-A 4-172743 (1992). This document describes a busy-status interrupt connection scheme wherein a plurality of lines are utilized, and a telephone set can be connected to another line without disconnecting the busy line connected to the telephone set, thereby to permit interrupt connections to the plurality of lines.

A so-called "button telephone set" is well suited for application to such an interrupt connection service utilizing the plurality of lines, and it is so constructed that a talk can be switched by the switching selection of an opposite party and an outside-line transfer function through the hooking manipulations of a user. Since, however, the button telephone set is not constructed so as to automatically perform the switching in response to the interrupt connection, the user himself/herself must memorize and perform accurate operations for switching the line to the opposite party of the interrupt connection.

A technique for addressing this problem is disclosed in, for example, Japanese Unexamined Patent Publication JP-A 2001-292463 (2001). This document describes a button telephone apparatus wherein a user can smoothly utilize an interrupt incoming call service without burdensome operations. The button telephone apparatus operates as stated below. When an interrupt incoming call for a telephone line as held by a slave (telephone) set A has been detected, the slave set A and another slave (telephone) set B are called up. When the slave set B has responded to the call, speech between the slave set B and the side of the interrupt incoming call can be formed. Thereafter, when the speech has been ended, a hooking signal is sent to the telephone line, while the telephone line is held, and a hold alarm is outputted to the slave set A so as to notify the end of the interrupt talk.

Furthermore, in case of an interrupt connection service utilizing a master-slave telephone system which is so constructed that a plurality of slave sets can be used for a single master (telephone) set, there is the problem that, when the slave set (or master set) is talking with an outside line, a ringing tone called a "paging tone" or an interrupt talk cannot be given forth from the master set or any other slave set to the talking slave set (or master set) for reasons of such as the protection of privacy.

A technique for addressing this problem is disclosed in, for example, Japanese Unexamined Patent Publication JP-A 5-344054 (1993). Proposed here is a cordless telephone wherein a paging signal being a ringing signal can be transmitted together with a voice signal by employing a frequency outside the bandwidth of the voice signal, and wherein, when the paging signal has been transmitted from, for example, a master set during a talk with an outside line, the outside line is held, and connection is switched for the talk between the master set and a slave set so as to permit the interrupt talk.

Even the techniques proposed in order to improve the problems concerning the actual operations of the interrupt connection services, have further problems as stated below. With the busy-status interrupt connection scheme disclosed in JP-A 4-172743, and the button telephone set disclosed in JP-A 2001-292463, the connection to the other line is possible without disconnecting the busy line connected to the telephone set, that is, the interrupt connections are possible to the plurality of lines, but there is the problem that, when the telephone set which is occupying the line and holding a talk receives an incoming call from another line anew, a user who is distant from the telephone set holding the talk cannot know the new incoming call.

With the master-slave telephone system disclosed in JP-A 5-344054, there is a problem that, when paging is performed in the off-hooking (talking) status of, for example, the slave set, the ringing tone is emitted from a loudspeaker or a bell included in the slave set, so it is heard by the talking opposite party.

SUMMARY OF THE INVENTION

An object of the invention is to provide a telephone control system in which the notification of an incoming call from another line for an interrupt connection and a calling-up method for the incoming call can be altered, depending upon whether a telephone set is in a talking (e.g., on-call) status or in a talk holding (e.g., call-holding) status, and in which interrupt connections to a plurality of lines and paging can be applied even to a master-slave telephone system.

The invention provides a telephone control system comprising a plurality of telephone sets which are connected to a plurality of lines, and in communication with each of which a line is selected from among the plurality of lines;

each of the telephone sets including:

status setting means capable of setting the telephone set into any of an on-call status, a call holding status and an on-hook status, and releasing any set status;

status discrimination means for discriminating which of the on-call status, the call holding status and the on-hook status the telephone set is in;

incoming-call detection means for detecting an incoming call signal from any of the plurality of lines;

notification means for notifying an incoming call by tone information and/or visible information in response to a detection output from the incoming-call detection means; and control means for controlling operations of the status setting means, the status discrimination means, the incoming-call detection means and the notification means, wherein in a state where the incoming-call detection means has detected a new incoming-call signal from any other line, when it has been discriminated by the status discrimination means that one line is in the call holding status, the control means controls the notification means so that an incoming call is notified by, at least, tone information, and when it has been discriminated by the status discrimination means that one line is in the on-call status, the control means controls the notification means so that an incoming call is notified by, at least, visible information.

According to the invention, when one line is in the call holding status in the state where the incoming-call detection means included in the telephone set has detected the new incoming call from any other line, the control means similarly included in the telephone set controls the notification means so as to notify the new incoming call by, at least, the tone information, and when one line is in the on-call status in the same state, the control means controls the notification means so as to notify the new incoming call by, at least, the visible information. Thus, even in the case where one line is set in the call holding status and where the user is distant from the telephone set, he/she can know the new incoming call by the tone information. Furthermore, in the case where one line is set in the on-call status and where the user is near the telephone set, he/she can know the new incoming call by the visible information which can keep silence.

Furthermore, in the invention, it is preferable that the telephone set further includes:

a tone-information input/output unit capable of inputting/outputting tone information; and a handset capable of generating and outputting tone information, and in a state where the incoming-call detection means has detected a new incoming-call signal from any other line, when it has been discriminated by the status discrimination means that one line is in the call holding status, the control means controls the notification means so that the tone-information input/output unit outputs the tone information and an incoming call is notified, and when it has been discriminated by the status discrimination means that one line is in the on-call status, the control means controls the notification means so that the handset outputs the tone information and an incoming call is notified.

According to the invention, when one line is in the call holding status in the state where the incoming-call detection means included in the telephone set has detected the new incoming call from any other line, the control means similarly included in the telephone set controls the notification means so that the new incoming call is notified by outputting the tone information from the tone-information input/output unit, and when one line is in the on-call status in the same state, the control means controls the notification means so that the new incoming call is notified by outputting the tone information from the handset. Thus, even in the case where one line is set in the call holding status and where the user is distant from the telephone set, he/she can know the new incoming call by the tone information. Furthermore, in the case where one line is set in the on-call status and where the user is talking, he/she can know the new incoming call by the tone information outputted from the handset, and hence, an opposite party with which he/she is talking can be prevented from hearing, for example, an incoming call tone which is the tone information.

Furthermore, in the invention it is preferable that the plurality of telephone sets include a master telephone set and a slave telephone set, the master telephone set includes slave-telephone-set calling-up means capable of calling up the slave telephone set or releasing the calling-up, and in a state where a signal for calling up the slave telephone set from the master telephone set is being issued by the slave-telephone-set calling-up means, when the slave telephone set is in the on-call status, the control means included in the slave telephone set controls the status setting means so as to set the slave telephone set in the call holding status for a predetermined time period, and controls the notification means so that the tone-information input/output unit generates and outputs a ringing tone to notify the calling-up.

According to the invention, the plurality of telephone sets constitutes a master-slave telephone system, and when the slave telephone set is in the on-call status in the state where the master telephone set is issuing the signal for calling up the slave telephone set, by the slave-telephone-set calling-up means, the control means included in the slave telephone set sets this slave telephone set in the call holding status for the predetermined time period, and the calling-up is notified by generating and outputting the ringing tone by the tone-information input/output unit. In this manner, when the slave telephone set is in the on-call status in the state where it is called up from the master telephone set, the setting is altered from the on-call status into the call holding status for, for example, the time period for which the ringing tone is being outputted, whereby the other party can be prevented from hearing the ringing tone.

Furthermore, in the invention it is preferable that the plurality of telephone sets include a master telephone set and a plurality of slave telephone sets, the slave telephone set includes slave-telephone-set calling-up means capable of calling-up another slave telephone set or releasing the calling-up, and in a state where a signal for calling up the other slave telephone set from one slave telephone set is being issued by the slave-telephone-set calling-up means, when the other slave telephone set is in the on-call status, the control means included in the other slave telephone set controls the notification means so that the calling-up is notified by the visible information, and when the other slave telephone set is in the call holding status, the control means included in the other slave telephone set controls the notification means so that the calling-up is notified by the visible information and the tone information.

According to the invention, the slave telephone set includes the slave-telephone-set calling-up means capable of calling up the other slave telephone set or releasing the calling-up, and when the other slave telephone set is in the on-call status in the state where the signal for calling up the other slave telephone set is being issued by the slave-telephone-set calling-up means, the control means included in the other slave telephone set notifies the calling-up by the visible information, and when the other slave telephone set is in the call holding status in the same state, the control means notifies the calling-up by the visible information and the ringing tone. In this manner, when the other slave telephone set called up from one slave telephone set is in the on-call status, the calling up is notified by the visible information, and hence, the other party can be prevented from hearing the ringing tone. On the other hand, when the other slave telephone set is in the call holding status, the calling-up is notified by the visible information and the ringing tone, and hence, the user can know the calling-up even in the case where he/she is distant from the other slave telephone set.

Furthermore, in the invention it is preferable that in a state where a signal for releasing the calling-up of the slave telephone set is being issued by the slave-telephone-set calling-up means, when the slave telephone set is in the call holding status, the control means included in the slave telephone set the calling-up of which is to be released, controls the notification means so that the output of the ringing tone is stopped, and controls the status setting means so that the setting of the call holding status is released and the on-call is set.

According to the invention, when the slave telephone set is in the call holding status in the state where the signal for releasing the calling-up of the slave telephone set is being issued by the slave-telephone-set calling-up means, the control means included in the slave telephone set the calling-up of which is to be released, stops the output of the ringing tone, and it releases the setting of the call holding status and sets the on-call status. In this manner, the slave telephone set whose setting has been altered from the on-call status into the temporary call holding status by the calling-up can be reset into the on-call status again by the release of the calling-up.

Furthermore, in the invention it is preferable that the tone information includes a hold tone indicating the call holding status, an incoming call tone for notifying the incoming call, and a ringing tone for calling up the slave telephone set, and the hold tone, the incoming call tone and the ringing tone are formed of tone qualities, tone levels and tone signals which are respectively different from one another.

According to the invention, the hold tone, incoming call tone and ringing tone being tone information are formed of the tone qualities, tone levels and tone signals which are respectively different from one another. Thus, the user is permitted to readily distinguish the hold tone, incoming call tone and ringing tone without erring.

Furthermore, in the invention it is preferable that the master telephone set is connected to the plurality of lines, and the slave telephone set is a cordless telephone set which communicates with the master telephone set by radio.

Furthermore, in the invention it is preferable that the plurality of lines include an analog communication line and a digital communication line.

According to the invention, the master telephone set is connected to the plurality of lines which include the analog communication line and the digital communication line, while the slave telephone set is the cordless telephone set which communicates with the master telephone set by radio. Thus, the invention realizes a convenient telephone control system which can cope with both analog communications and digital communications, and in which interrupt connections are possible to both the master and slave telephone sets.

BRIEF DESCRIPTION OF THE DRAWINGS

Other and further objects, features, and advantages of the invention will be more explicit from the following detailed description taken with reference to the drawings wherein:

FIG. 3 is a diagram for explaining the steps of an exchange operation which is performed by the switchboard of a central office in the telephone control system;

FIG. 4 is a diagram showing the steps of an incoming call process in the telephone control system;

FIG. 5 is a diagram in which the operations of the master set responsive to input signals are arranged every status;

FIG. 6 is a diagram in which the operations of the master and slave sets responsive to a calling-up release signal or a new incoming-call signal in the state where the slave set is outputting a ringing tone in response to a slave-set ringing signal are arranged every status;

DETAILED DESCRIPTION OF THE PREFERRED EMBODIMENTS

Figure 1:
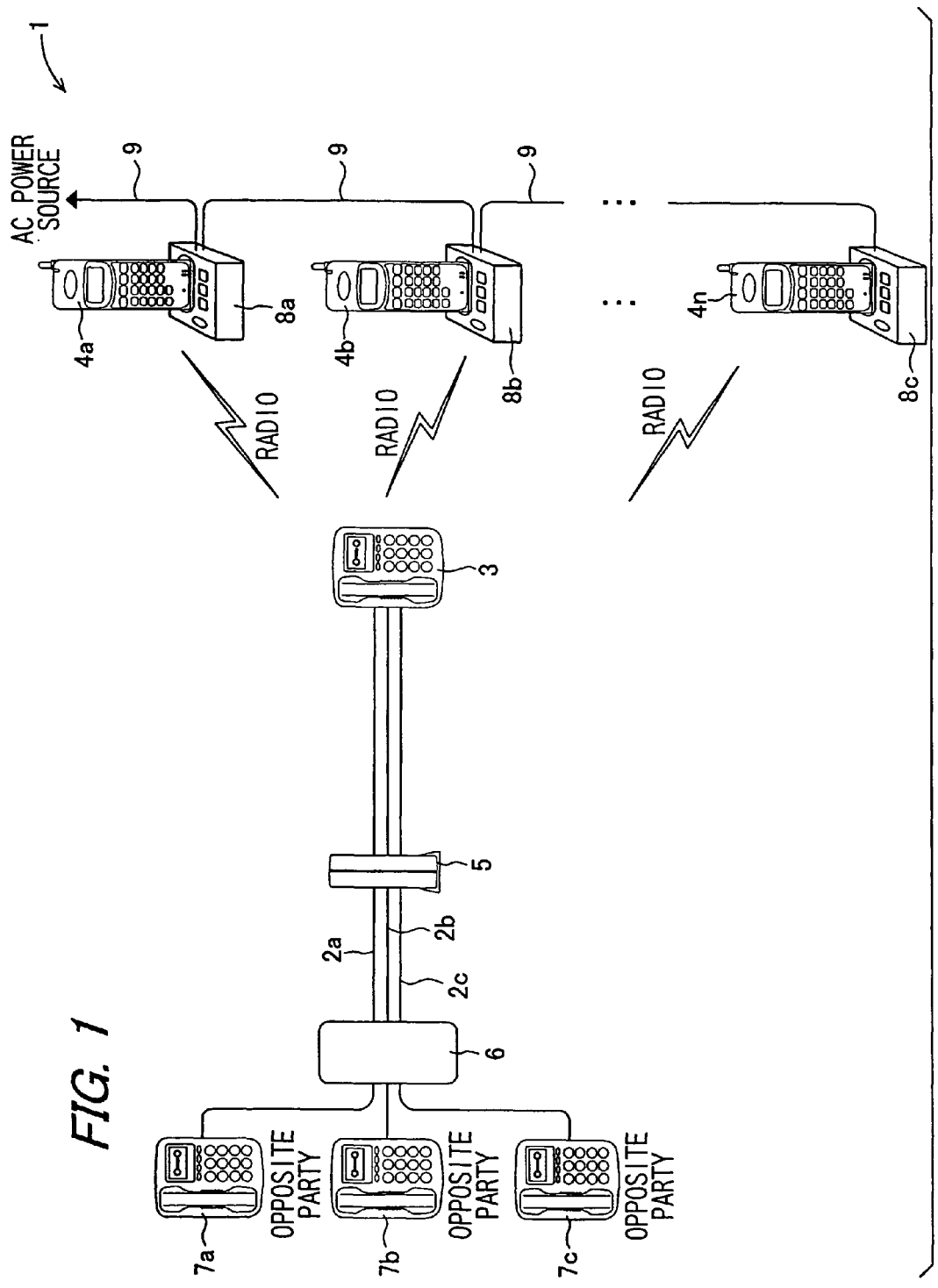
FIG. 1 is a schematic view showing the construction of a telephone control system which is an embodiment of the invention.

Now referring to the drawings, preferred embodiments of the invention are described below.

FIG. 1 is a schematic view showing the construction of a telephone control system 1 which is an embodiment of the invention. The telephone control system 1 includes a master telephone set 3 (hereinafter, simply termed "master set") which is connected to three lines 2a, 2b, 2c, and n slave telephone sets 4a, 4b, 4n (hereinafter, simply termed "slave sets") which communicate with the master set 3 through radio channels at frequencies allocated beforehand. In this manner, in the embodiment, the slave sets 4a, 4b, . . . , 4n corresponding to the master set 3 constitute cordless telephone sets.

The master set 3 is connected to a customer premise switchboard 5 constructed of a router or a repeater, and it is further connected to the telephone sets 7a, 7b, 7c of opposite parties for conversations, through a network 6 which is connected to the customer premise switchboard 5. The three lines to which the master set 3 is connected consist of, for example, the public line 2a being an analog line such as Public Switched Telephone Network (abbreviated to "PSTN"), and the digital communication lines 2b, 2c such as transmission lines or power-line transmission networks conforming to the standards of Integrated Services Digital Network (abbreviated to "ISDN") or Home Phone-line Networking Alliance (abbreviated to "HPNA").

The n slave sets 4a, 4b, . . . , 4n are respectively arranged on n charging devices 8a, 8b, . . . , 8n. General reference is sometimes made herein to the lines, slave sets, opposite-party telephone sets and charging devices by omitting the alphabetical suffixes. The charging device 8 has a cord 9 connected thereto, and it is supplied with AC power from an AC power source (not shown), through the cord 9. The slave set 4 is charged by the charging device 8 when it is arranged on the charging device 8.

Figure 2:
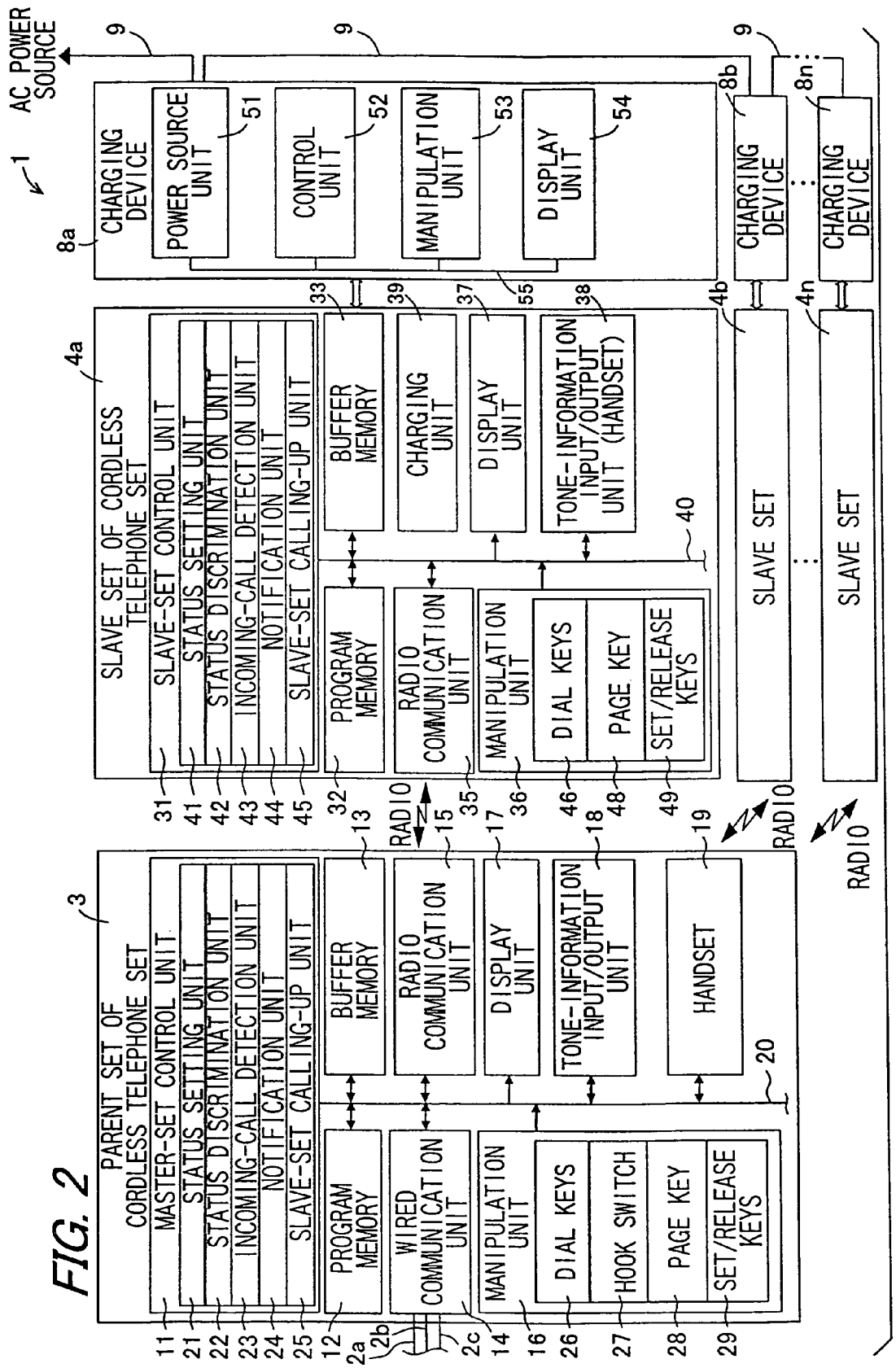
FIG. 2 is a block diagram showing the simplified construction of the telephone control system shown in FIG. 1.

FIG. 2 is a block diagram showing the simplified construction of the telephone control system 1 shown in FIG. 1. The master set 3 includes master-set control unit 11 as control means, a program memory 12, a buffer memory 13, a wired communication unit 14, a radio communication unit 15, a manipulation unit 16, a display unit 17, a tone-information input/output unit 18, a handset 19 (hereinafter, termed "handset"), and a bus 20 connecting the various portions mentioned above.

The master-set control unit 11 is constructed of a microcomputer or the like incorporating, for example, a central processing unit (CPU), and it executes control programs stored in the program memory 12, thereby to control the operations of the various portions constituting the master set 3, through the bus 20. The master-set control unit 11 is not restricted to a CPU, but it may well be constructed of a microprocessing unit (MPU) or the like.

Furthermore, a status setting unit 21 as status setting means, a status discrimination unit 22 as status discrimination means, an incoming-call detection unit 23 as incoming-call detection means, a notification unit 24 as notification means and a slave-telephone-set calling-up unit 25 as slave-telephone-set calling-up means are included in the master-set control unit 11. Status setting unit 21 can set the master set 3 into any of an on-call status, a call holding status and an on-hook status, and can release any of the set statuses. Status discrimination unit 22 discriminates which of the on-call status, call holding status and on-hook status the master set 3 is in. Incoming-call detection unit 23 detects incoming call signals from the plurality of lines 2. Notification unit 24 provides notification of an incoming call by tone information and/or visible information in response to a detection output from the incoming-call detection unit 23. Slave-telephone-set calling-up unit 25 can call up the slave set 4 and release the calling-up. The master-set control unit 11 controls the operations of the respective unit 21-25 as described above.

The program memory 12 is constructed of a storage medium, for example, Read Only Memory (ROM) or Electrical Erasable & Programmable ROM (EEPROM), and it stores therein the control programs for operating the master-set control unit 11, as described before. The buffer memory 13 is constructed of a storage medium, for example, Random Access Memory (RAM) or EEPROM, and it temporarily stores therein input/output data when the master-set control unit 11 controls the operation of the whole master set 3.

The wired communication unit 14 is constructed of, for example, a line control circuit which changes-over the opposite parties of the plurality of lines 2, and a modem which is a signal conversion device for performing data communications through an analog communication line. This wired communication unit 14 is connected to the analog line 2a and the digital lines 2b, 2c, and it is capable of speech and data communications with the opposite-party telephone sets 7 through the network 6 in accordance with the exchange control operations of the customer premise switchboard 5.

The radio communication unit 15 includes a cordless-telephone control circuit taking charge of processes from the establishment of speech with the slave set 4 to the completion of the speech, an RF unit such as tuner for transmitting and receiving electric waves, an antenna for transmitting and receiving the electric waves to and from the slave set 4, a compander for compressing/expanding signals, and so forth. A known frequency-modulation scheme such as power saving cordless telephone scheme, minute power scheme, or a type using Personal Handyphone System (PHS) in common, is employed as a radio communication scheme for the radio communication unit 15.

The manipulation unit 16 includes dial keys 26 with which a telephone number or the like is inputted, a hook switch 27 which issues a talk start signal (also called "response signal") and a talk end signal (also called "line disconnection signal") through the manipulations of the handset 19, a page key 28 which gives the instructions of setting and releasing a paging function, and set/release keys 29 which set and release various functions bestowed on the master set 3.

The display unit 17 is formed of, for example, a small-sized liquid crystal display (abbreviated to "LCD"), a plasma display (abbreviated to "PD"), an electroluminescent display (abbreviated to "ELD") or light emitting diodes (abbreviated to "LED"). It can display the status of each line (such as "disengaged", "engaged", "call incoming", "talking" and "hold"), the other party, the telephone number, reception data, etc., and can flickeringly display a calling-up status and alarm status based on the paging function.

The tone-information input/output unit 18 includes, for example, a small-sized microphone, analog/digital conversion circuit, bell, small-sized loudspeaker and digital/analog conversion circuit. It converts tone information items inputted without resorting to the handset 19, into voice signals and inputs the voice signals, and it generates and outputs tone information items which include a holding tone indicative of the call holding status, an incoming call tone for notifying the presence of an incoming call, a Ringing tone for calling up the slave set 4.

The handset 19 is a voice input/output unit for talking with the other party. In this embodiment, when in the talking status of the master set 3 as discriminated by the status discrimination unit 22, and a new incoming call from any other line than the busy line has been detected by the incoming-call detection unit 23, the master-set control unit 11 controls the operation of the notification unit 24, thereby to generate an incoming call tone and notifies the new incoming call from the side of the telephone receiver of the handset 19 through the bus 20.

In this embodiment, the tone qualities, tone levels and tone signals of the holding tone, incoming call tone and Ringing tone generated and outputted by the tone-information input/output unit 18, and the incoming call tone generated and outputted by the handset 19, are set as indicated in Table 1 below. As indicated in the Table 1, the holding tone, incoming call tone and Ringing tone are endowed with the tone qualities, tone levels and tone signals different from one another, so that a user can readily distinguish the holding tone, incoming call tone and Ringing tone without erring.

TABLE 1

| | TONE LEVEL | TONE QUALITY, TONE SIGNAL |
|---|---|---|
| Holding tone | 60 dB | 800 Hz signal modulated with signal of 16 Hz |
| Incoming call tone | 80 dB | 400 Hz signal modulated with signal of 16 Hz |
| Ringing tone | 80 dB | 500 Hz signal modulated with signal of 16 Hz |

Since the n slave sets 4 have the same constructions, the slave set 4a shall have its construction described as a typical example. Those constituents of the slave set 4a which are expressed by the same names as those of the constituents of the master set 3 have the same functions in the master set 3 and the slave set 4a and shall therefore be omitted from description.

The slave set 4a includes a slave-set control unit 31 as control means, a program memory 32, a buffer memory 33, a radio communication unit 35, a manipulation unit 36, a display unit 37, a tone-information input/output unit 38, a charging unit 39, and a bus 40 connecting the various portions mentioned above. Although the slave-set control unit 31 has the "slave set" affixed thereto because of the constituent of the slave set 4a, it has the same construction and functions as those of the master-set control unit 11.

Furthermore, the slave-set control unit 31 includes a status setting unit 41 as status setting means, a status discrimination unit 42 as status discrimination means, an incoming-call detection unit 43 as incoming-call detection means, a notification unit 44 as notification means and a slave-telephone-set calling-up unit 45 as slave-telephone-set calling-up means. Status setting unit 41 is capable of setting the slave set 4a into any of an on-call status, call holding status and on-hook status, and releasing the set status. Status discrimination unit 42 discriminates which of the on-call status, call holding status and on-hook status the slave set 4a is in. Incoming-call detection unit 43 detects incoming call signals from the plurality of lines 2. Notification unit 44 notifies an incoming call by tone information and/or visible information in response to a detection output from the incoming-call detection unit 43.

Slave-set calling-up unit 45 is capable of calling up any of the other slave sets 4b, . . . , 4n and releasing the calling-up.

Unlike the master set 3, the slave set 4a is a cordless telephone set and does not have any wired communication unit. Furthermore, the slave set 4a itself serves as a handset. Therefore, although the manipulation unit 36 is furnished with dial keys 46, a page key 48 and set/release keys 49, it does not include any hook switch. The charging unit 39 disposed in the slave set 4a includes a chargeable small-sized lithium battery or nickel-cadmium battery, and a charging control circuit. Thus, when the slave set 4a is set on the charging device 8, the battery of the charging unit 39 is charged with power for driving the slave set 4a, by the charging device 8.

Since the n charging devices 8 disposed in correspondence with the respective slave sets 4 have the same constructions, the charging device 8a shall have its construction described as a typical example. The charging device 8a is constructed including a power source unit 51, a control unit 52, a manipulation unit 53 and a display unit 54, and it is connected to the AC power source (not shown), through the cord 9.

The power source unit 51 converts AC power supplied from the AC power source through the cord 9, into a DC voltage so as to supply the DC voltage to the charging unit 39 of the slave set 4a. The manipulation unit 53 is constructed of, for example, a page key for giving the instructions of setting and releasing a paging function, a power source switch, and ON/OFF keys for charging. The display unit 54 is constructed of, for example, LED(s) which display charging statuses such as "uncharged", "charging" and "completely charged". The control unit 52 is connected with the power source unit 51, manipulation unit 53 and display unit 54 by a circuit 55 so as to control the operations of these units 51, 53 and 54.

FIG. 3 is a diagram for explaining the steps of an exchange operation which is performed by the switchboard of a central office in the telephone control system 1. The figure exemplifies the exchange operation which is performed by the control of the switchboard of the central office (not shown), through the network 6 between the originating side telephone set 7 and the master set 3, for example, included in the telephone control system 1. Numerals enclosed with circles in FIG. 3 indicate the order of operations, and the exchange operation will be described in the order below.

In the operation <1>, an originating signal is transmitted from the originating side telephone set 7 to the network 6 by an off-hooking manipulation in which the handset of the originating side telephone set 7 is taken up from the telephone set proper so as to be brought away from a hook portion. In the operation <2>, the switchboard transmits a dial tone signal to the originating side telephone set 7 so as to wait for dial reception. In the operation <3>, the telephone number of the master set 3 being a receiving side telephone set is transmitted to the network 6 by the dialing manipulation of the originating side telephone set 7. In the operation <4>, the switchboard executes a path connection process, so that a ringing signal is transmitted to the master set 3, while a ringing tone is transmitted to the originating side telephone set 7. In the operation <5>, an incoming call is recognized on the master set 3, and the off-hooking manipulation of the handset 19 of the master set 3 is made, whereby a response signal (communication start signal) is transmitted to the network 6. Therefore, the switchboard transmits a response signal to the originating side telephone set 7, and accounting is started. Speech is established between the originating side telephone set 7 and the master set 3 by these operations.

When the talk has been completed, a line disconnection signal (talk end signal) is transmitted from the originating side telephone set 7 to the network 6 in the operation <6>, by an on-hooking manipulation in which the handset is put on the telephone set proper so as to be set on the hook portion. The switchboard executes a path disconnection process in accordance with the line disconnection signal, and it transmits a line disconnection signal to the master set 3. In the next operation <7>, the switchboard transmits a busy tone signal to the master set 3, and the accounting is stopped. In the operation <8>, when the talk has been disconnected by the on-hooking manipulation of the handset 19 of the master set 3, a clear-back signal is transmitted to the network 6 so as to recover an initial status.

The line disconnection operation thus far described concerns a case where the talk is disconnected by the originating side telephone set 7. In the case where the master set 3 is subjected to an on-hooking manipulation for line disconnection in advance of the originating side telephone set 7, a line disconnection operation proceeds as described below. In the operation <6>', a line disconnection signal is transmitted to the network 6 by the on-hooking manipulation of the master set 3. The switchboard executes a path disconnection process in accordance with the line disconnection signal, and it transmits a line disconnection signal to the originating side telephone set 7. In the operation <7>', the switchboard transmits a busy tone signal to the originating side telephone set 7, and the accounting is stopped. In the operation <8>, when the talk has been disconnected by the on-hooking manipulation of the originating side telephone set 7, a clear-back signal is transmitted to the network 6 so as to recover the initial status.

FIG. 4 is a diagram showing the steps of an incoming call process in the telephone control system 1. FIG. 4 exemplifies the process in the case where, in a state in which the master set 3 (or the slave set 4) has received an incoming call from the line 2a and established a talk through the line 2a, a new incoming call arrives from the line 2b, or in the case where, in a state in which the master set 3 (or the slave set 4) has received an incoming call from the line 2a and established an on-call status and has thereafter placed the call on hold, a new incoming call arrives from the line 2c. In FIG. 4, contents displayed on the display unit 17 of the master set 3 are indicated in rectangular frames, and input manipulations, the states of ringing tone outputs, and the state of incoming call notification based on the LED are indicated in rectangular frames of double vertical lines. Displayed on the display unit 17 of the master set 3 are the "other parties" which are connected to the lines 2a, 2b, 2c, and the operating status of the master set 3, that is, any of "on-hook/waiting (status)", "on-call (status)", "(call/talk) holding (status)" and "incoming call (status)".

When the master set 3 is in the on-hook status without the reception of any call, Line 2a: "Waiting", Line 2b: "Waiting" and Line 2c: "Waiting" are displayed on the display unit 17. When an incoming call from the party A of the line 2a has been detected by the incoming-call detection unit 23 in the on-hook status, the master-set control unit 11 displays Line 2a: "Incoming call" "party A", Line 2b: "Waiting" and Line 2c: "Waiting" on the display unit 17. Further, the master-set control unit 11 controls the operation of the notification unit 24 so as to flicker the incoming-call displaying LED included in the display unit 17, and to generate and output an incoming call tone from the bell included in the tone-information input/output unit 18. On this occasion, the master-set control unit 11 gives the slave-set calling-up unit 25 a page key signal so as to output a slave-set ringing signal from this slave-set calling-up unit 25 and to output a ringing tone (bell tone) from the tone-information input/output unit 38 of the slave set 4.

When the off-hooking manipulation of the handset 19 of the master set 3 has been made in accordance with the incoming call notification based on the notification unit 24, a response signal is transmitted to the network 6, and speech with the opposite party A of the line 2a is established. When the talk with the opposite party A of the line 2a has been established, the master-set control unit 11 displays Line 2a: "Talking" "party A", Line 2b: "Waiting" and Line 2c: "Waiting" on the display unit 17.

When, in the on-call status between the master set 3 and the party A of the line 2a, a new incoming call from the party B of the line 2b has been detected by the incoming-call detection unit 23, the status discrimination unit 22 discriminates the statuses of the lines 2a and 2c, and it outputs the discriminated result that the line 2a is in the on-call status, while the line 2c is in the on-hook status. In response to the output of the status discrimination unit 22, the master-set control unit 11 displays Line 2a: "Talking" "party A", Line 2b: "Incoming call" "party B" and Line 2c: "Waiting" on the display unit 17. Simultaneously, it controls the operation of the notification unit 24 so as to flicker at least the incoming-call displaying LED of the display unit 17 as emitting visible information, and to generate and output an incoming call tone from the handset 19. On this occasion, the master-set control unit 11 gives the slave-set calling-up unit 25 a page key signal so as to output a slave-set ringing signal from this slave-set calling-up unit 25 and to output a ringing tone (bell tone) from the tone-information input/output unit 38 of the slave set 4.

Next, a setting different from the foregoing will be described. After the master set 3 has once established its talk with the opposite party A of the line 2a, a hold key included in the set/release keys 29 is manipulated to establish the call holding status. Then, Line 2a: "Holding", Line 2b: "Waiting" and Line 2c "Waiting" are displayed on the display unit 17, and a hold tone is generated by the tone-information input/output unit 18 and outputted to the opposite party A of the line 2a. When in the call holding status with the opposite party A of the line 2a in this manner, a new incoming call from the party C of the line 2c has been detected by the incoming-call detection unit 23, the status discrimination unit 22 discriminates the statuses of the lines 2a and 2b, and it outputs the discriminated result that the line 2a is in the call holding status, while the line 2b is in the on-hook status. In response to the output of the status discrimination unit 22, the master-set control unit 11 displays Line 2a: "Holding" "party A", Line 2b: "Waiting" and Line 2c: "Incoming call" "party C" on the display unit 17. Simultaneously, it controls the operation of the notification unit 24 so as to flicker the incoming-call displaying LED of the display unit 17 and to generate and output an incoming call tone by the bell included in the tone-information input/output unit 18. On this occasion, the master-set control unit 11 gives the slave-set calling-up unit 25 a page key signal so as to output a slave-set ringing signal from this slave-set calling-up unit 25 and to output a ringing tone (bell tone) from the tone-information input/output unit 38 of the slave set 4.

FIG. 5 is a diagram in which the operations of the master and slave sets 3, 4 responsive to input signals are arranged for every status. More specifically, FIG. 5 is a diagram in which the output operations of the notification unit 24, 44 in the master set 3 and the slave set 4 as described before are arranged for each of the states where the master set 3 is in the on-hook status for any of the lines 2a, 2b, 2c, where it is in the on-call status with the line 2a, and where it is in the call holding status with the line 2a.

Furthermore, FIG. 6 is a diagram in which the operations of the master and slave sets 3, 4 in the case where a page-release key signal (calling-up release signal) or a new incoming-call signal has been inputted with the slave set 4 outputting a ringing tone in response to a slave-set ringing signal are arranged every status.

First, there will be described a case where, in the waiting status of the master set 3, a slave-set ringing signal is sent from the slave-set calling-up unit 25 of the master set 3 so as to call up the slave set 4 and to output a ringing tone. When an input signal is a page-release key signal based on a page key manipulation, the ringing tone having been generated and outputted by the bell included in the tone-information input/output unit 38 of the slave set 4 is stopped, and the master set 3 falls into a re-waiting status. When an input signal is a new incoming-call signal, the ringing tone (bell tone) based on the tone-information input/output unit 38 is stopped in the slave set 4. Also, in the master set 3, an incoming call is displayed on the display unit 17 with the LED simultaneously flickered, an incoming call tone based on the bell of the tone-information input/output unit 18 is outputted, and the master set 3 is set into a re-waiting status.

Next, there will be described a case where, in the temporary call holding status of the master set 3, a slave-set ringing signal is sent from the slave-set calling-up unit 25 of the master set 3 so as to call up the slave set 4 and to output a ringing tone. When an input signal is a page-release key signal based on a page key manipulation, the ringing tone based on the bell of the tone-information input/output unit 38 of the slave set 4 is stopped, and the master set 3 falls into a re-talking status. When an input signal is a new incoming-call signal, the ringing tone (bell tone) based on the tone-information input/output unit 38 is stopped in the slave set 4. Also, in the master set 3, an incoming call is displayed on the display unit 17 with the LED simultaneously flickered, an incoming call tone based on the handset 19 is outputted, and the master set 3 is set into a re-talking status.

Further, there will be described a case where, in the call holding status of the master set 3, a slave-set ringing signal is sent from the slave-set calling-up unit 25 of the master set 3 so as to call up the slave set 4 and to output a ringing tone. When an input signal is a page-release key signal based on a page key manipulation, the ringing tone based on the bell of the tone-information input/output unit 38 of the slave set 4 is stopped, and the master set 3 falls into a re-call-holding status. When an input signal is a new incoming-call signal, the ringing tone (bell tone) of the tone-information input/output unit 38 of the slave set 4 is stopped. Also, in the master set 3, an incoming call is displayed on the display unit 17 with the LED simultaneously flickered, an incoming call tone based on the bell of the tone-information input/output unit 18 is outputted, and the master set 3 is set into a re-call-holding status.

Figure 7:
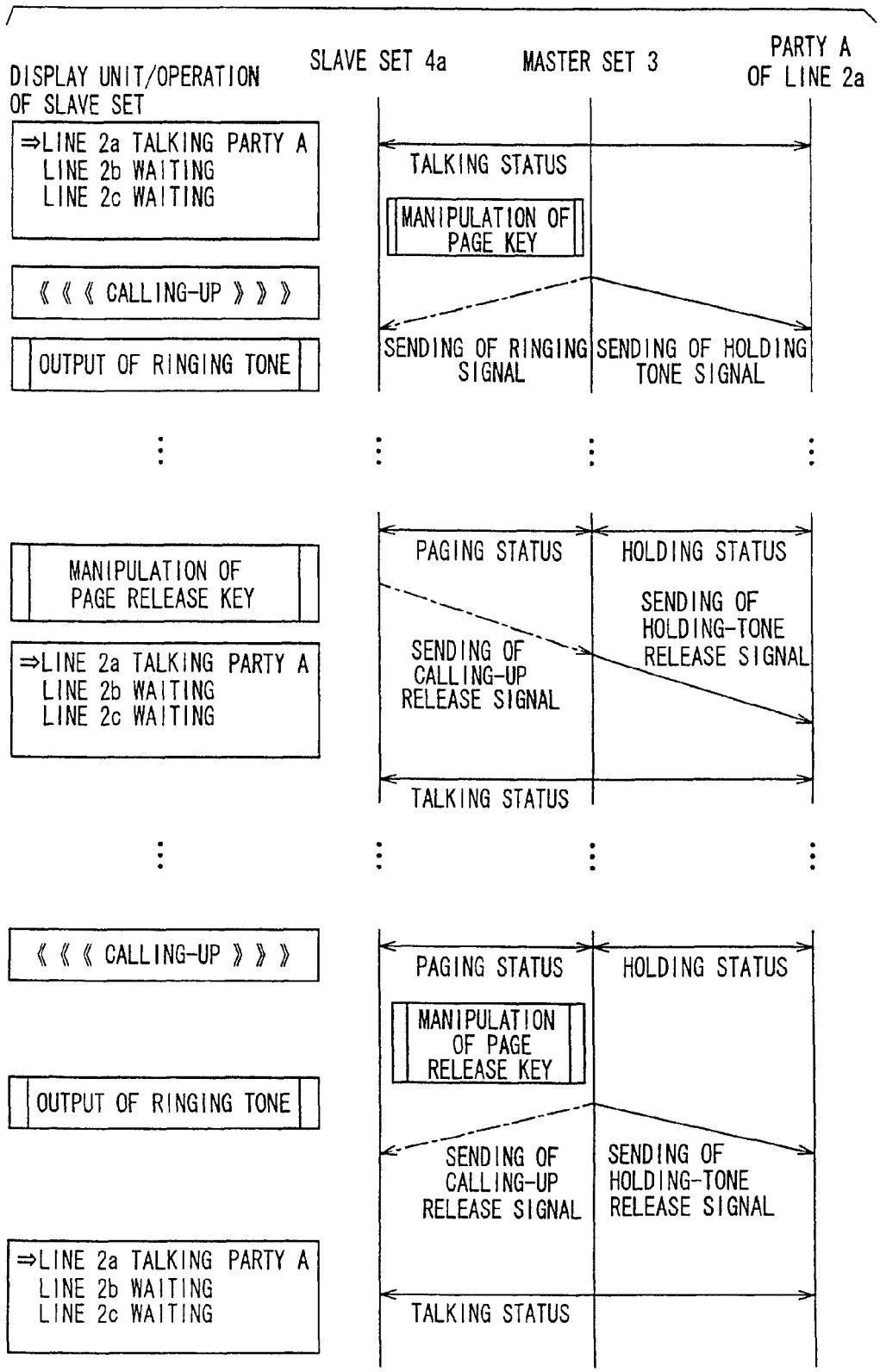
FIG. 7 is a diagram showing the steps of a calling-up operation and a calling-up release operation from the master set to the slave set.

FIG. 7 is a diagram showing the steps of a calling-up operation and a calling-up release operation from the master set 3 to the slave set 4. More specifically, FIG. 7 shows the steps of calling-up in the case where the master set 3 has been required to call up the slave set 4a in, for example, a status in which this slave set 4a is talking with the party A of the line 2a, and the steps of releasing the calling-up. In FIG. 7, contents displayed on the display unit 37 of the slave set 4a are indicated in rectangular frames, and input manipulations and the states of ringing tone outputs based on the bell are indicated in rectangular frames of double vertical lines. Displayed on the display unit 37 of the slave set 4a are the "opposite parties" which are connected to the lines 2a, 2b, 2c, and the operating status of the slave set 4a, that is, any of "waiting/on-hook (status)", "talking/on-call (status)", "(talk/call) holding (status)" and "incoming call (status)", or the presence of slave set calling-up.

When the slave set 4a is in the on-call status with the party A of the line 2a, Line 2a: "Talking" "party A", Line 2b: "Waiting" and Line 2c: "Waiting" are displayed on the display unit 37. When, in the on-call status of the slave set 4a, the page key 28 is manipulated on the master set 3 so as to input a page key signal to the slave-set calling-up unit 25, a ringing signal is sent from the slave-set calling-up unit 25 of the master set 3 to the slave set 4a, and a holding tone is generated in the tone-information input/output unit 18 of the master set 3 so as to transmit a holding tone signal to the party A of the line 2a.

The status discrimination unit 42 of the slave set 4a having received the ringing tone discriminates that the line 2a is in the on-call status. The slave-set control unit 31 controls the status setting unit 41 in accordance with the discriminated result of the status discrimination unit 42 so as to set the line 2a into the call holding status for a predetermined time period, in this embodiment, for a time period for which a paging status is continued (time period for which the output of a ringing tone is continued). In the call holding status, the slave-set control unit 31 controls the notification unit 44 so as to generate and output the ringing tone from the tone-information input/output unit 38 and to display the presence of "calling-up" on the display unit 37.

When, in the status in which the master set 3 is calling up the slave set 4a, that is, in the paging status, the user of this slave set 4a has recognized the calling-up and has subjected the page key 48 to a page release manipulation, the slave-set control unit 31 controls the status setting unit 41 so as to reset the slave set 4a from the call holding status into the on-call status, and it controls the notification unit 44 so as to stop the output of the ringing tone based on the tone-information input/output unit 38. Furthermore, it causes the slave-set calling-up unit 45 to send a calling-up release signal to the master set 3. The master set 3 having received the calling-up release signal transmits a holding-tone release signal to the party A of the line 2a. When the slave set 4a and the party A of the line 2a have been recovered into the on-call status, Line 2a: "Talking" "party A", Line 2b: "Waiting" and Line 2c: "Waiting" are displayed on the display unit 37 of the slave set 4a again.

On the other hand, when in the paging status in which the master set 3 is calling up the slave set 4a, the page key 28 has been subjected to a page release manipulation on the side of the master set 3 unlike the calling-up release on the side of the slave set 4a, the master set 3 sends a holding-tone release signal to the opposite party A of the line 2a and also sends a calling-up release signal from its slave-set calling-up unit 25 to the slave set 4a. The slave-set control unit 31 having received the calling-up release signal from the master set 3 controls the status setting unit 41 so as to reset the slave set 4a from the call holding status into the on-call status.

Figure 8:
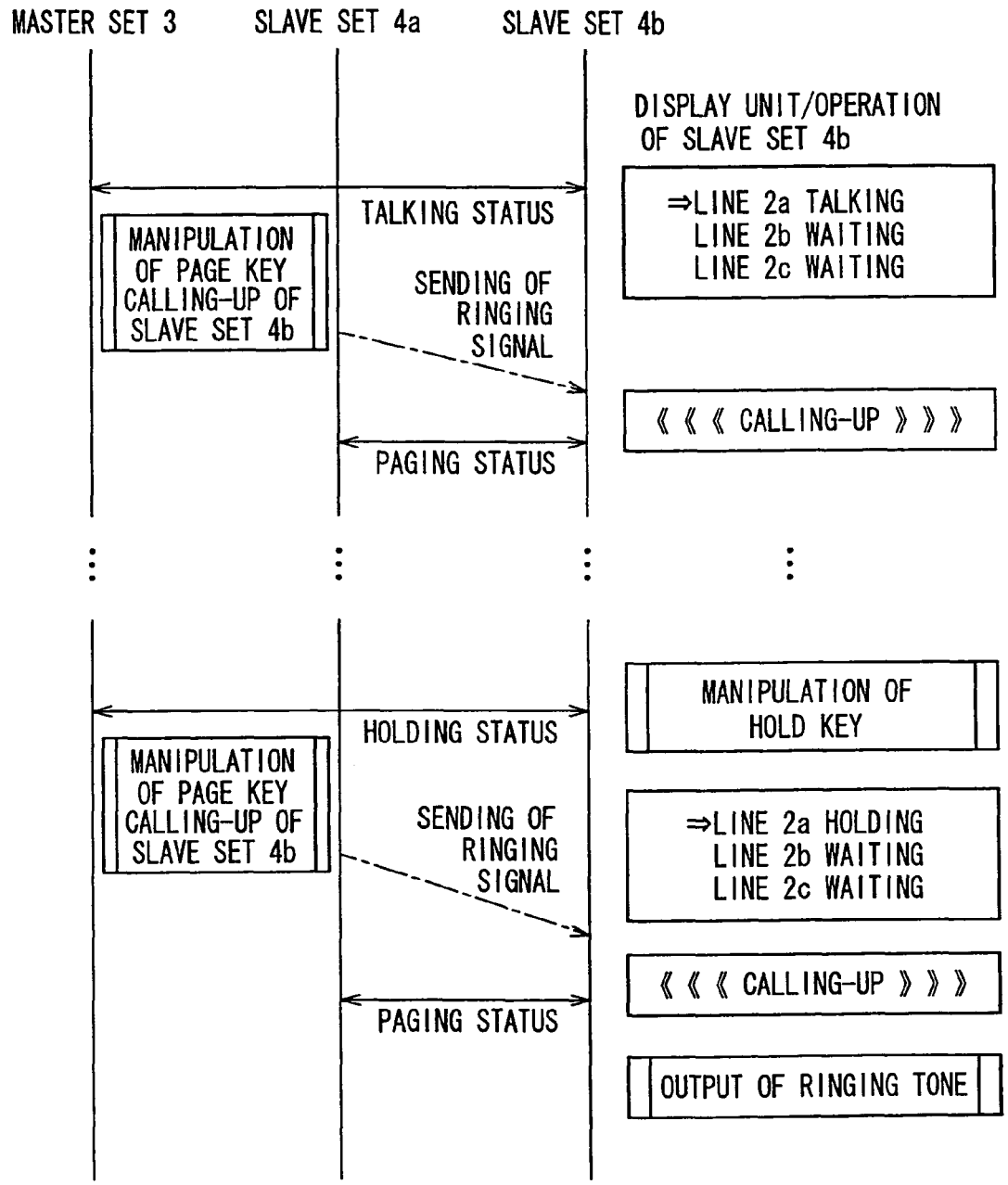
FIG. 8 is a diagram showing the steps of a calling-up operation from a slave set to another slave set.

FIG. 8 is a diagram showing the steps of a calling-up operation from the slave set 4a to the different slave set 4b. More specifically, FIG. 8 shows the steps of calling-up in the case where the slave set 4a has been required to call up the slave set 4b in, for example, a status in which this slave set 4b is on-call, or holding a call, with the party A of the line 2a through the master set 3. In FIG. 8, contents displayed on the display unit 37 of the slave set 4b are indicated in rectangular frames, and input manipulations and the states of ringing tone outputs based on the bell are indicated in rectangular frames of double vertical lines. Displayed on the display unit 37 of the slave set 4b are the operating status of the slave set 4b, that is, any of "waiting/on-hook (status)", "talking/on-call (status)", "(talk/call) holding (status)" and "incoming call (status)", or the presence of calling-up.

First, when the slave set 4b is in the on-call status with the party A of the line 2a through the master set 3, Line 2a: "Talking", Line 2b: "Waiting" and Line 2c: "Waiting" are displayed on the display unit 37 of the slave set 4b. When, in the talking status of the slave set 4b, a page key signal is inputted to the slave-set calling-up unit 45 by manipulating the page key 48 in the slave set 4a, a ringing signal is sent from the slave-set calling-up unit 45 of the slave set 4a to the slave set 4b, and the slave-set control unit 31 of the slave set 4b causes the display unit 37 to display the presence of "calling-up".

Next, when the slave set 4b is in the call holding status with the party A of the line 2a through the master set 3, Line 2a: "Holding", Line 2b: "Waiting" and Line 2c: "Waiting" are displayed on the display unit 37 of the slave set 4b. When, in the call holding status of the slave set 4b, a page key signal is inputted to the slave-set calling-up unit 45 by manipulating the page key 48 in the slave set 4a, a ringing signal is sent from the slave-set calling-up unit 45 of the slave set 4a to the slave set 4b, and the slave-set control unit 31 of the slave set 4b causes the display unit 37 to display the presence of "calling-up" and also controls the notification unit 44 so as to generate and output a ringing tone based on the bell of the tone information input/output unit 38.

Figure 9:
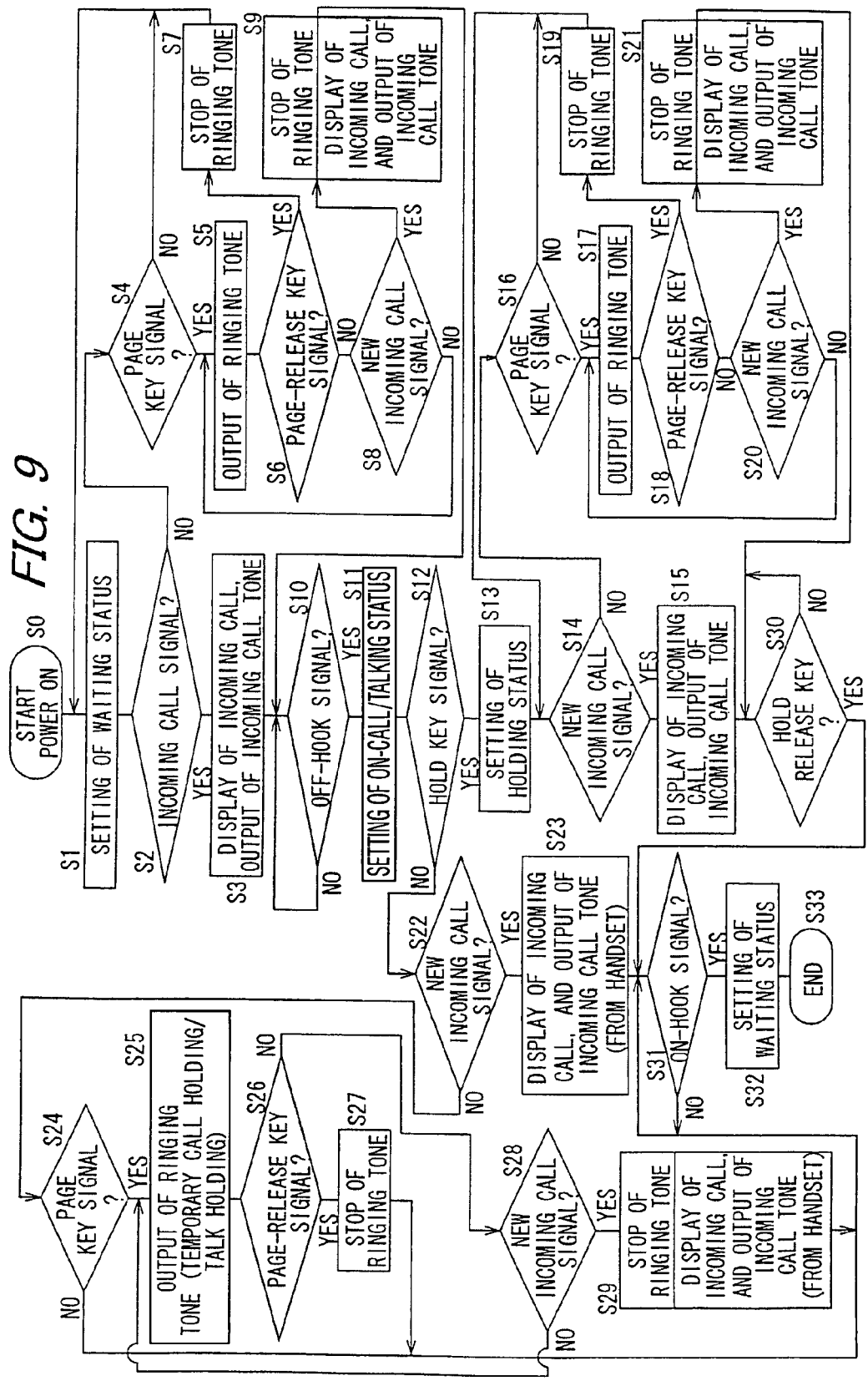
FIG. 9 is a flow chart for explaining the series of operations of the telephone control system.

FIG. 9 is a flow chart for explaining the series of operations of the telephone control system 1. The series of operations of the telephone control system 1, such as an incoming call process and a calling-up process, will be described with reference to FIG. 9.

At a step S0, the power sources of the master set 3, the slave set 4, the charging device 8, etc. constituting the telephone control system 1 are turned ON to hold them in operable states. At a step S1, no incoming call is received from any of the lines 2a, 2b, 2c. Here, the status discrimination unit 22 of the master set 3 discriminates the waiting status, the status setting unit 21 sets the master set 3 into the on-hook status, and "Waiting" is displayed for all the lines 2a, 2b, 2c on the display unit 17. At a step S2, it is judged whether or not a first incoming call signal from any of the lines 2a, 2b, 2c has been detected as an input signal. The judgment is made by the master-set control unit 11 on the basis of the presence or absence of the output of the incoming-call detection unit 23. On condition that the incoming call signal has been detected as an affirmative judged result, the routine proceeds to a step S3, and on condition that the incoming call signal has not been detected as a negative judged result, the routine proceeds to a step S4.

At the step S3, since the first incoming call signal has been detected in the on-hook status, the master-set control unit 11 controls the notification unit 24 to notify the pertinent incoming call by displaying "Incoming call" on the screen of the display unit 17 and simultaneously flickering the LED and also generating an incoming call tone by means of the bell of the tone-information input/output unit 18, whereupon the routine proceeds to a step S10. At the step S4, it is judged whether or not the input signal is a page key signal based on the manipulation of the page key 28. The judgment is made by the master-set control unit 11 on the basis of an output from the slave-set calling-up unit 25 to which the page key signal is inputted. On condition that the input signal is the page key signal as an affirmative judged result, the routine proceeds to a step S5, and on condition that the input signal is not the page key signal as a negative judged result, the routine returns to the step S1.

At the step S5, since the page key signal has been inputted in the on-hook status, a ringing signal is sent from the slave-set calling-up unit 25 to the slave set 4. In response to the ringing signal, the slave-set control unit 31 controls the notification unit 44 to notify the pertinent paging by generating and outputting a ringing tone by means of the bell of the tone-information input/output unit 38, whereupon the routine proceeds to a step S6. At the step S6, it is judged whether or not a page-release key signal has been inputted by the manipulation of the page key 28 (or 48) of the master set 3 or slave set 4. The judgment is made by the master-set control unit 11 (or slave-set control unit 31) on the basis of an output from the slave-set calling-up unit 25 (or 45) to which the page-release key signal is inputted. On condition that the page-release key signal has been inputted as an affirmative judged result, the routine proceeds to a step S7, and on condition that the page-release key signal has not been inputted as a negative judged result, the routine proceeds to a step S8.

At the step S7, the slave-set control unit 31 controls the notification unit 44 so as to stop the ringing tone based on the bell of the tone-information input/output unit 38, whereupon the routine returns to the step S1. At the step S8, it is judged whether or not a new incoming call signal from any other line has been detected during the calling-up of the slave set 4. On condition that the new incoming call signal has been detected as an affirmative judged result, the routine proceeds to a step S9, and on condition that the new incoming call signal has not been detected as a negative judged result, the routine returns to the step S5.

At the step S9, the ringing tone based on the bell of the tone-information input/output unit 38 of the slave set 4 is stopped. Further, the pertinent incoming call from the other line is notified by displaying "Incoming call" on the screen of the display unit 17 of the master set 3 and simultaneously flickering the LED, and also generating and outputting an incoming call tone by means of the bell of the tone-information input/output unit 18, whereupon the routine proceeds to the step S10. At the step S10, it is judged whether or not an off-hook signal has been inputted by the off-hooking manipulation of the handset 19 of the master set 3. The judgment is made by the master-set control unit 11 on the basis of an output from the hook switch 27 as sent through the bus 20. On condition that the off-hook signal has been inputted as an affirmative judged result, the routine proceeds to a step S11, and on condition that the off-hook signal has not been inputted as a negative judged result, an input is waited at the step S10.

At the step S11, the master set 3 is set into the on-call status with the other line from which the new incoming call has been received, by the status setting unit 21, so that the master set 3 becomes capable of talking. At a step S12, it is judged whether or not a call holding signal has been inputted by the manipulation of the hold key included in the set/release keys 29 of the master set 3. The judgment is made by the master-set control unit 11 on the basis of an output from the set/release keys 29 as sent through the bus 20. On condition that the call holding signal has been inputted as an affirmative judged result, the routine proceeds to a step S13, and on condition that the call holding signal has not been inputted as a negative judged result, the routine proceeds to a step S16. At the step S13, the master set 3 occupies the busy line and is set into the call holding status by the status setting unit 21, whereupon the routine proceeds to a step S14. At the step S14, it is judged whether or not a new incoming call signal from any other line has been detected in the call holding status. On condition that the new incoming call signal has been detected as an affirmative judged result, the routine proceeds to a step S15, and on condition that the new incoming call signal has not been detected as a negative judged result, the routine proceeds to a step S16.

At the step S15, since the new incoming call signal from the other line has been detected in the call holding status, the master-set control unit 11 notifies the pertinent incoming call by displaying "Incoming call" on the screen of the display unit 17 and simultaneously flickering the LED, and also generating and outputting an incoming call tone by means of the bell of the tone-information input/output unit 18, whereupon the routine proceeds to a step S30. At the step S16, it is judged whether or not a page key signal has been inputted by the manipulation of the page key 28 in the call holding status. On condition that the page key signal has been inputted as an affirmative judged result, the routine proceeds to a step S17, and on condition that the page key signal has not been inputted as a negative judged result, the routine returns to the step S14.

At the step S17, since the page key signal has been inputted in the call holding status, the slave-set calling-up unit 25 sends a ringing signal to the slave set 4. In response to the ringing signal, the slave-set control unit 31 notifies the pertinent paging by controlling the notification unit 44 so as to generate and output a ringing tone by means of the bell of the tone-information input/output unit 38, whereupon the routine proceeds to a step S18. At the step S18, it is judged whether or not a page-release key signal has been inputted by the manipulation of the page key 28 (or 48) of the master set 3 or the slave set 4. On condition that the page-release key signal has been inputted as an affirmative judged result, the routine proceeds to a step S19, and on condition that the page-release key signal has not been inputted as a negative judged result, the routine proceeds to a step S20.

At the step S19, the slave-set control unit 31 stops the ringing tone based on the bell of the tone-information input/output unit 38, whereupon the routine returns to the step S14. At the step S20, it is judged whether or not a new incoming call signal from any other line has been detected during the calling-up of the slave set 4. On condition that the new incoming call signal has been detected as an affirmative judged result, the routine proceeds to a step S21, and on condition that the new incoming call signal has not been detected as a negative judged result, the routine returns to the step S17. At the step S21, the ringing tone based on the bell of the tone-information input/output unit 38 of the slave set 4 is stopped. Further, the pertinent new incoming call from the other line is notified by displaying "Incoming call" on the screen of the display unit 17 of the master set 3 and simultaneously flickering the LED and also generating and outputting an incoming call tone by means of the bell of the tone-information input/output unit 18, whereupon the routine proceeds to the step S30.

At the step S22, it is judged whether or not a new incoming call signal from any other line has been detected in the on-call status. On condition that the new incoming call signal has been detected as an affirmative judged result, the routine proceeds to a step S23, and on condition that the new incoming call signal has not been detected as a negative judged result, the routine proceeds to a step S24. At the step S23, since the new incoming call signal has been detected in the on-call status, the master-set control unit 11 notifies the pertinent incoming call by controlling the notification unit 24 so as to display "Incoming call" on the screen of the display unit 17 and simultaneously flicker the LED, and to generate and output an incoming call tone by means of the handset 19, whereupon the routine proceeds to a step S31. At the step S24, it is judged whether or not a page key signal has been inputted by the manipulation of the page key 28 in the on-call status. On condition that the page key signal has been inputted as an affirmative judged result, the routine proceeds to a step S25, and on condition that the page key signal has not been inputted as a negative judged result, the routine proceeds to the step S31.

At the step S25, since the page key signal has been inputted in the on-call status, the master-set control unit 11 controls the status setting unit 21 so as to set the master set 3 into the temporary call holding status, and it causes the slave-set calling-up unit 25 to send a ringing signal to the slave set 4. In response to the ringing signal from the slave-set calling-up unit 25, the slave-set control unit 31 notifies the pertinent paging by generating and outputting a ringing tone by means of the bell of the tone-information input/output unit 38. At a step S26, it is judged whether or not a page-release key signal has been inputted by the manipulation of the page key 28 (or 48) of the master set 3 or the slave set 4. On condition that the page-release key signal has been inputted as an affirmative judged result, the routine proceeds to a step S27, and on condition that the page-release key signal has not been inputted as a negative judged result, the routine proceeds to a step S28. At the step S27, the slave-set control unit 31 stops the ringing tone based on the bell of the tone-information input/output unit 38, and the master-set control unit 11 controls the status setting unit 21 so as to set the master set 3 into the talking status, whereupon the routine proceeds to the step S31.

At the step S28, it is judged whether or not a new incoming call signal from any other line has been detected during the calling-up of the slave set 4. On condition that the new incoming call signal has been detected as an affirmative judged result, the routine proceeds to a step S29, and on condition that the new incoming call signal has not been detected as a negative judged result, the routine returns to the step S25. At the step S29, the slave-set control unit 31 stops the ringing tone based on the bell of the tone-information input/output unit 38, and the master-set control unit 11 notifies the pertinent new incoming call by displaying "Incoming call" on the screen of the display unit 17 of the master set 3 and simultaneously flickering the LED and also generating and outputting an incoming call tone by means of the handset 19, whereupon the routine proceeds to the step S31.

At the step S30, it is judged whether or not a hold release signal has been inputted by the manipulation of the set/release keys 29 of the master set 3. The judgment is made by the master-set control unit 11 on the basis of an output from the set/release keys 29 as sent through the bus 20. On condition that the hold release signal has been inputted as an affirmative judged result, the routine proceeds to the step S31, and on condition that the hold release signal has not been inputted as a negative judged result, the input of the hold release signal is waited at the step S30.

At the step S31, it is judged whether or not an on-hook signal has been inputted by the on-hooking manipulation of the handset 19 of the master set 3 upon the completion of communications. The judgment is made by the master-set control unit 11 on the basis of an output from the hook switch 27 as sent through the bus 20. On condition that the on-hook signal has been inputted as an affirmative judged result, the routine proceeds to a step S32, and on condition that the on-hook signal has not been inputted as a negative judged result, the input of the on-hook signal is waited at the step S31. At the step S32, in response to the on-hook signal, the master-set control unit 11 controls the status setting unit 21 so as to set the master set 3 into the waiting status, whereupon a step S33 is reached. The series of operations are ended at the step S33.

Although, in this embodiment, the plurality of telephone sets are the master and slave sets being the cordless telephone sets as described above, they may well be interconnected through wire without being restricted to the exemplary telephone sets. Furthermore, although the plurality of lines are the PSTN being the analog line, and the ISDN and HPNA being the digital lines, they may well be other analog and digital lines without being restricted to the exemplary lines.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A telephone control system comprising:
   a plurality of telephone sets which are connected to a plurality of lines, each of the telephone sets including:
   a status setting device capable of setting the telephone set into any of an on-call status, a call holding status and an on-hook status, and capable of releasing any set status;
   a status discriminator for discriminating status of the plurality of lines to be one of the on-call status, the call holding status and the on-hook status;
   an incoming-call detector for detecting an incoming call signal from any one of the plurality of lines;
   a notification device for providing a notification of an incoming call by one or both of tone information and visible information in response to a detection output from the incoming-call detector; and
   a controller for controlling operations of the status setting device, the status discriminator, the incoming-call detector and the notification device,
   wherein in a state in which the incoming-call detector has detected a new incoming-call signal from a first line,
   when the status discriminator discriminates the call holding status for a second line, the controller controls the notification device so that the incoming call is notified by, at least, tone information, and
   when the status discriminator discriminates the on-call status for the second line, the controller controls the notification device so that the incoming call is notified by, at least, visible information.

2. The telephone control system of claim 1, wherein the telephone set further includes:
   a tone-information input/output unit capable of inputting/outputting tone information; and
   a handset capable of generating and outputting tone information, and
   in a state in which the incoming-call detector has detected the new incoming-call signal from the first line,
   when the status discriminator discriminates the call holding status for the second line, the controller controls the notification device so that the tone-information input/output unit outputs the tone information, whereby notification is provided for the incoming call; and
   when the status discriminator discriminates the on-call status for the second line, the controller controls the notification device so that the handset outputs the tone information, whereby notification is provided for the incoming call.

3. The telephone control system of claim 2, wherein the plurality of telephone sets includes a master telephone set and a slave telephone set, the master telephone set includes slave-telephone-set calling-up circuitry capable of calling up the slave telephone set or releasing the calling-up of the slave telephone set, and in a state in which a signal for calling up the slave telephone set from the master telephone set is being issued by the slave-telephone-set calling-up circuitry, when the slave telephone set has the on-call status, the controller included in the slave telephone set controls the status setting device so as to set the slave telephone set in the call holding status for a time period, and controls the notification device so that the tone-information input/output unit generates and outputs a ringing tone to provide notification of the calling-up.

4. The telephone control system of claim 2, wherein the plurality of telephone sets include a master telephone set and a plurality of slave telephone sets, the slave telephone set includes slave-telephone-set calling-up circuitry capable of calling-up another slave telephone set or releasing the calling-up of the other slave telephone set, and in a state in which a signal for calling up the other slave telephone set from one slave telephone set is being issued by the slave-telephone-set calling-up circuitry, when the other slave telephone set has the on-call status, the controller included in the other slave telephone set controls the notification device so that a calling-up notification is provided by visible information, and when the other slave telephone set has the call holding status, the controller included in the other slave telephone set controls the notification device so that the calling-up notification is provided by visible information and tone information.

5. The telephone control system of claim 3, wherein in a state in which a signal for releasing the calling-up of the slave telephone set is being issued by the slave-telephone-set calling-up circuitry, when the slave telephone set has the call holding status, the controller included in the to-be released slave telephone set, controls the notification device so that the output of the ringing tone is stopped, and controls the status setting device so that the setting of the call holding status is released and the on-call status is set.

6. The telephone control system of claim 4, wherein in a state in which a signal for releasing the calling-up of the slave telephone set is being issued by the slave-telephone-set calling-up circuitry, when the slave telephone set has the call holding status, the controller included in the to-be released slave telephone set, controls the notification device so that the output of the ringing tone is stopped, and controls the status setting device so that the setting of the call holding status is released and the on-call status is set.

7. The telephone control system of claim 3, wherein the tone information includes a hold tone indicating the call holding status, an incoming call tone for providing notification of the incoming call, and a ringing tone for calling up the slave telephone set, and the hold tone, the incoming call tone and the ringing tone are formed of tone qualities, tone levels and tone signals which are respectively different from one another.

8. The telephone control system of claim 4, wherein the tone information includes a hold tone indicating the call holding status, an incoming call tone for providing notification of the incoming call, and a ringing tone for calling up the slave telephone set, and the hold tone, the incoming call tone and the ringing tone are formed of tone qualities, tone levels and tone signals which are respectively different from one another.

9. The telephone control system of claim 3, wherein the master telephone set is connected to the plurality of lines, and the slave telephone set is a cordless telephone set which communicates with the master telephone set by radio.

10. The telephone control system of claim 4, wherein the master telephone set is connected to the plurality of lines, and the slave telephone set is a cordless telephone set which communicates with the master telephone set by radio.

11. The telephone control system of claim 1, wherein the plurality of lines includes an analog communication line and a digital communication line.

12. A telephone control system comprising:

a plurality of telephone sets connected to multiple communication lines, each telephone set including a status setting device for setting and releasing telephone set status, a status discriminator, an incoming-call detector, a notification device for providing incoming call notification, and a controller, wherein if the incoming-call detector detects an incoming call signal on a second one of the communication lines and the status discriminator discriminates a call holding status for a first one of the communication lines, the controller controls the notification device to provide at least an aural incoming call notification, and wherein if the incoming-call detector detects the incoming call signal on the second one of the communication lines and the status discriminator discriminates an on-call status for the first one of the communication lines, the controller controls the notification device to provide at least a visual incoming call notification.

13. The telephone control system of claim 12, wherein each telephone set further includes a tone-information input/output unit and a handset, and if the incoming-call detector detects the incoming-call signal on the second one of the communication lines and the status discriminator discriminates the call holding status for the first one of the communication lines, the controller controls the notification device so that the tone-information input/output unit outputs tone information as the aural incoming call notification, and if the incoming-call detector detects the incoming-call signal on the second one of the communication lines and the status discriminator discriminates the on call status for the first one of the communication lines, the controller controls the notification device so that the handset outputs tone information as the aural incoming call notification.

14. The telephone control system of claim 13, wherein the plurality of telephone sets includes a master telephone set and a slave telephone set, the master telephone set including slave-telephone-set calling-up circuitry, and if the slave-telephone-set calling-up circuitry issues a calling-up signal for calling up the slave telephone set and the slave telephone set has the on-call status, the controller of the slave telephone set controls the status setting device thereof to set the call holding status for the slave telephone set for a time period, and controls the notification device thereof so that the tone-information input/output unit thereof generates and outputs a ringing tone to provide calling-up notification.

15. The telephone control system of claim 14, wherein if a release signal for releasing the calling-up of the slave telephone set is issued by the slave-telephone-set calling-up circuitry and the slave telephone set has the call holding status, the controller included in the to-be released slave telephone set controls the notification device thereof so that output of the ringing tone is stopped, and controls the status setting device thereof so that the call holding status is released and the on-call status is set.

16. The telephone control system of claim 13, wherein
the plurality of telephone sets includes a master telephone set and a plurality of slave telephone sets, each slave telephone set including slave-telephone-set calling-up circuitry,
if a calling up signal for a second slave telephone set is issued by the slave-telephone-set calling-up circuitry of a first slave telephone set and the second slave telephone set has the on-call status, the controller of the second slave telephone set controls the notification device thereof to provide a visual calling-up notification, and
if a calling up signal for the second slave telephone set is issued by the slave-telephone-set calling-up circuitry of the first slave telephone set when the second slave telephone set has the call holding status, the controller of the second slave telephone set controls the notification device thereof to provide an aural and visual calling-up notification.

* * * * *